US009838712B2

(12) United States Patent
Lin et al.

(10) Patent No.: US 9,838,712 B2
(45) Date of Patent: Dec. 5, 2017

(54) METHOD OF SIGNALING FOR DEPTH-BASED BLOCK PARTITIONING

(71) Applicant: HFI Innovation Inc., Zhubei, Hsinchu County (TW)

(72) Inventors: Jian-Liang Lin, Su'ao Township, Yilan County (TW); Yi-Wen Chen, Taichung (TW); Xianguo Zhang, Beijing (CN); Kai Zhang, Beijing (CN); Jicheng An, Beijing (CN); Han Huang, Beijing (CN)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 203 days.

(21) Appl. No.: 14/656,993

(22) Filed: Mar. 13, 2015

(65) Prior Publication Data

US 2015/0264399 A1    Sep. 17, 2015

Related U.S. Application Data

(60) Provisional application No. 61/955,868, filed on Mar. 20, 2014.

(30) Foreign Application Priority Data

Mar. 17, 2014  (WO) ................ PCT/CN2014/073547
Jun. 26, 2014  (WO) ................ PCT/CN2014/080862

(51) Int. Cl.
*H04N 19/597*  (2014.01)
*H04N 19/119*  (2014.01)
(Continued)

(52) U.S. Cl.
CPC ......... *H04N 19/597* (2014.11); *H04N 19/119* (2014.11); *H04N 19/159* (2014.11);
(Continued)

(58) Field of Classification Search
CPC .. H04N 19/597; H04N 19/119; H04N 19/159; H04N 19/176; H04N 19/70; H04N 19/0048
(Continued)

(56) References Cited

U.S. PATENT DOCUMENTS

2004/0030736 A1   2/2004  Scheuermann
2006/0095941 A1   5/2006  Fidler et al.
(Continued)

FOREIGN PATENT DOCUMENTS

| CN | 1759386 A | 4/2006 |
|---|---|---|
| WO | WO 2013/034649 A1 | 3/2013 |
| WO | WO 2013/069975 A1 | 5/2013 |

*Primary Examiner* — William C Vaughn, Jr.
*Assistant Examiner* — Jae N Noh
(74) *Attorney, Agent, or Firm* — McClure, Qualey & Rodack, LLP

(57) ABSTRACT

A method of signaling depth-based block partitioning (DBBP) for multi-view or three-dimensional (3D) video coding is disclosed. In one embodiment, the DBBP flag is signaled for all candidate prediction modes of the current texture coding unit including a non-2N×N partition mode. The group of candidate prediction modes may consist of 2N×N partition mode and N×2N partition mode. If the DBBP flag indicates the DBBP being used for the current texture coding unit, DBBP encoding is applied to the current texture coding unit or DBBP decoding is applied to one or more PUs associated with the current texture coding unit to recover the current texture coding unit. If the DBBP flag indicates the DBBP being not used for the current texture coding unit, a prediction partition mode is signaled at an encoder side or parsed at a decoder side from a CU (coding unit) level of the bitstream.

19 Claims, 7 Drawing Sheets

(51) Int. Cl.
    *H04N 19/159*     (2014.01)
    *H04N 19/70*     (2014.01)
    *H04N 19/176*     (2014.01)
    *H04N 13/00*     (2006.01)

(52) U.S. Cl.
    CPC ........... *H04N 19/176* (2014.11); *H04N 19/70* (2014.11); *H04N 13/0048* (2013.01)

(58) Field of Classification Search
    USPC .................................................... 375/240.12
    See application file for complete search history.

(56) References Cited

U.S. PATENT DOCUMENTS

| | | |
|---|---|---|
| 2010/0054275 A1 | 3/2010 | Noonan et al. |
| 2010/0284412 A1 | 11/2010 | Meuninck |
| 2013/0271571 A1* | 10/2013 | Wu .................... H04N 13/0048 348/43 |
| 2014/0010283 A1* | 1/2014 | Lim ................. H04N 19/00024 375/240.02 |
| 2014/0314143 A1* | 10/2014 | Lee ...................... H04N 19/139 375/240.02 |
| 2015/0382025 A1* | 12/2015 | Gu ....................... H04N 19/182 375/240.24 |
| 2016/0134874 A1* | 5/2016 | Konieczny ........... H04N 19/597 375/240.08 |
| 2016/0165232 A1* | 6/2016 | Srinivasan ........... H04N 19/119 375/240.08 |
| 2016/0316208 A1 | 10/2016 | Lee et al. |
| 2016/0323573 A1* | 11/2016 | Ikai ..................... H04N 19/597 |
| 2017/0163773 A1 | 6/2017 | Krzyzanowski et al. |

\* cited by examiner

| $p_{0,0}$ | $p_{1,0}$ | $p_{2,0}$ | $p_{3,0}$ | $p_{4,0}$ | $p_{5,0}$ | $p_{6,0}$ | $p_{7,0}$ |
|---|---|---|---|---|---|---|---|
| $p_{0,1}$ | $p_{1,1}$ | $p_{2,1}$ | $p_{3,1}$ | $p_{4,1}$ | $p_{5,1}$ | $p_{6,1}$ | $p_{7,1}$ |
| $p_{0,2}$ | $p_{1,2}$ | $p_{2,2}$ | $p_{3,2}$ | $p_{4,2}$ | $p_{5,2}$ | $p_{6,2}$ | $p_{7,2}$ |
| $p_{0,3}$ | $p_{1,3}$ | $p_{2,3}$ | $p_{3,3}$ | $p_{4,3}$ | $p_{5,3}$ | $p_{6,3}$ | $p_{7,3}$ |
| $p_{0,4}$ | $p_{1,4}$ | $p_{2,4}$ | $p_{3,4}$ | $p_{4,4}$ | $p_{5,4}$ | $p_{6,4}$ | $p_{7,4}$ |
| $p_{0,5}$ | $p_{1,5}$ | $p_{2,5}$ | $p_{3,5}$ | $p_{4,5}$ | $p_{5,5}$ | $p_{6,5}$ | $p_{7,5}$ |
| $p_{0,6}$ | $p_{1,6}$ | $p_{2,6}$ | $p_{3,6}$ | $p_{4,6}$ | $p_{5,6}$ | $p_{6,6}$ | $p_{7,6}$ |
| $p_{0,7}$ | $p_{1,7}$ | $p_{2,7}$ | $p_{3,7}$ | $p_{4,7}$ | $p_{5,7}$ | $p_{6,7}$ | $p_{7,7}$ |

*Fig. 5A*

| $p_{0,0}$ | $p_{1,0}$ | $p_{2,0}$ | $p_{3,0}$ | $p_{4,0}$ | $p_{5,0}$ | $p_{6,0}$ | $p_{7,0}$ |
|---|---|---|---|---|---|---|---|
| $p_{0,1}$ | $p_{1,1}$ | $p_{2,1}$ | $p_{3,1}$ | $p_{4,1}$ | $p_{5,1}$ | $p_{6,1}$ | $p_{7,1}$ |
| $p_{0,2}$ | $p_{1,2}$ | $p_{2,2}$ | $p_{3,2}$ | $p_{4,2}$ | $p_{5,2}$ | $p_{6,2}$ | $p_{7,2}$ |
| $p_{0,3}$ | $p_{1,3}$ | $p_{2,3}$ | $p_{3,3}$ | $p_{4,3}$ | $p_{5,3}$ | $p_{6,3}$ | $p_{7,3}$ |
| $p_{0,4}$ | $p_{1,4}$ | $p_{2,4}$ | $p_{3,4}$ | $p_{4,4}$ | $p_{5,4}$ | $p_{6,4}$ | $p_{7,4}$ |
| $p_{0,5}$ | $p_{1,5}$ | $p_{2,5}$ | $p_{3,5}$ | $p_{4,5}$ | $p_{5,5}$ | $p_{6,5}$ | $p_{7,5}$ |
| $p_{0,6}$ | $p_{1,6}$ | $p_{2,6}$ | $p_{3,6}$ | $p_{4,6}$ | $p_{5,6}$ | $p_{6,6}$ | $p_{7,6}$ |
| $p_{0,7}$ | $p_{1,7}$ | $p_{2,7}$ | $p_{3,7}$ | $p_{4,7}$ | $p_{5,7}$ | $p_{6,7}$ | $p_{7,7}$ |

*Fig. 5B*

METHOD OF SIGNALING FOR DEPTH-BASED BLOCK PARTITIONING

CROSS REFERENCE TO RELATED APPLICATIONS

The present invention claims priority to PCT Patent Application, Serial No. PCT/CN2014/073547, filed on Mar. 17, 2014, entitled "Method of Signaling of Depth-Based Block Partitioning Mode for Three-Dimensional and Multi-View Video Coding", U.S. Provisional Patent Application Ser. No. 61/955,868, filed on Mar. 20, 2014, entitled "Method of Signaling for PCM, SDC, and DBBP Modes in 3-D and Multiview Video Coding" and PCT Patent Application, Serial No. PCT/CN2014/080862, filed on Jun. 26, 2014, entitled "Methods for the Transmission of Flags Related to DBBP". The PCT Patent Applications and the U.S. Provisional Patent Applications are hereby incorporated by reference in their entireties.

FIELD OF THE INVENTION

The present invention relates to three-dimensional (3D) and multi-view video coding. In particular, the present invention relates to signaling for depth-based block partitioning (DBBP) to improve coding efficiency.

BACKGROUND AND RELATED ART

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the 3D video is capable of offering arbitrary viewpoints of dynamic scenes and provides viewers the sensation of realism.

To reduce the inter-view redundancy, disparity-compensated prediction (DCP) has been used as an alternative to motion-compensated prediction (MCP). MCP refers to an inter-picture prediction that uses already coded pictures of the same view in a different access unit, while DCP refers to inter-picture prediction that uses already coded pictures of other views in the same access unit, as illustrated in FIG. 1. The three-dimensional/multi-view data consists of texture pictures (110) and depth maps (120). The motion compensated prediction is applied to texture pictures or depth maps in the temporal direction (i.e., the horizontal direction in FIG. 1). The disparity compensated prediction is applied to texture pictures or depth maps in the view direction (i.e., the vertical direction in FIG. 1). The vector used for DCP is termed disparity vector (DV), which is analog to the motion vector (MV) used in MCP.

3D-HEVC is an extension of HEVC (High Efficiency Video Coding) that is being developed for encoding/decoding 3D video. One of the views is referred to as the base view or the independent view. The base view is coded independently of the other views as well as the depth data. Furthermore, the base view is coded using a conventional HEVC video coder.

In 3D-HEVC, a hybrid block-based motion-compensated DCT-like transform coding architecture is still utilized. The basic unit for compression, termed coding unit (CU), is a 2N×2N square block, and each CU can be recursively split into four smaller CUs until the predefined minimum size is reached. Each CU contains one or multiple prediction units (PUs). The PU size can be 2N×2N, 2N×N, N×2N, or N×N. When asymmetric motion partition (AMP) is supported, the PU size can also be 2N×nU, 2N×nD, nL×2N and nR×2N.

The 3D video is typically created by capturing a scene using video camera with an associated device to capture depth information or using multiple cameras simultaneously, where the multiple cameras are properly located so that each camera captures the scene from one viewpoint. The texture data and the depth data corresponding to a scene usually exhibit substantial correlation. Therefore, the depth information can be used to improve coding efficiency or reduce processing complexity for texture data, and vice versa. For example, the corresponding depth block of a texture block reveals similar information corresponding to the pixel level object segmentation. Therefore, the depth information can help to realize pixel-level segment-based motion compensation. Accordingly, a depth-based block partitioning (DBBP) has been adopted for texture video coding in the current 3D-HEVC (3D video coding based on the High Efficiency Video Coding (HEVC) standard).

In the depth-based block partitioning (DBBP) mode, arbitrarily shaped block partitioning for the collocated texture block is derived based on a binary segmentation mask computed from the corresponding depth map. Each of the two partitions (resembling foreground and background) is motion compensated and merged afterwards based on the depth-based segmentation mask.

A single flag is added to the coding syntax to signal to the decoder that the underlying block uses DBBP for prediction. When current coding unit is coded with the DBBP mode, the corresponding partition size is set to SIZE_2N×2N and bi-prediction is inherited.

A disparity vector derived from the DoNBDV (Depth-oriented Neighboring Block Disparity Vector) process is applied to identify a corresponding depth block in a reference view as shown in FIG. 2. In FIG. 2, corresponding depth block 220 in a reference view for current texture block 210 in a dependent view is located based on the location of the current texture block and derived DV 212, which is derived using DoNBDV according to 3D-HEVC standard. The corresponding depth block has the same size as current texture block. When the depth block is found, a threshold is calculated based on the average of all depth pixels within the corresponding depth block. Afterwards, a binary segmentation mask m_D (x,y) is generated based on depth values and the threshold. When the depth value located at the relative coordinator (x, y) is larger than the threshold, the binary mask m_D (x,y) is set to 1. Otherwise, m_D (x,y) is set to 0. An example is shown in FIG. 3. The mean value of the virtual block (310) is determined in step 320. The values of virtual depth samples are compared to the mean depth value in step 330 to generate segmentation mask 340. The segmentation mask is represented in binary data to indicate whether an underlying pixel belongs to segment 1 or segment 2, as indicated by two different line patterns in FIG. 3

The DoNBDV process enhances the NBDV by extracting a more accurate disparity vector from the depth map. The NBDV is derived based on disparity vector from neighboring blocks. The disparity vector derived from the NBDV process is used to access depth data in a reference view. A final disparity vector is then derived from the depth data.

The DBBP process partitions the 2N×2N block into two partitioned block. A motion vector is determined for each partition block. In the decoding process, each of the two decoded motion parameters is used for motion compensation performed on a whole 2N×2N block. The resulting prediction signals, i.e., p_T0 (x,y) and p_T1 (x,y) are combined using the DBBP mask m_D (x,y), as depicted in FIG. 4. The combination process is defined as follows $$p\_T(x, y) = \begin{cases} p\_T0(x, y), & \text{if } m\_D(x, y) = 1 \\ p\_T1(x, y), & \text{otherwise} \end{cases} \quad (4)$$

In FIG. 4, the two prediction blocks are merged into one on a pixel by pixel basis according to the segmentation mask and this process is referred as bi-segment compensation. In this example, the N×2N block partition type is selected and two corresponding motion vectors (MV1 and MV2) are derived for two partitioned blocks respectively. Each of the motion vectors is used to compensate a whole texture block (410). Accordingly, motion vector MV1 is applied to texture block 420 to generate prediction block 430 according to motion vector MV1, and motion vector MV2 is applied to texture block 420 also to generate prediction block 432 according to motion vector MV2. The two prediction blocks are merged by applying respective segmentation masks (440 and 442) to generate the final prediction block (450).

Whether the DBBP mode is used is signaled for a coding unit as shown in Table 1A according to the current 3D-HEVC specification (Gerhard Tech et al, 3D-*HEVC Draft Text* 3, Joint Collaborative Team on 3D Video Coding Extension Development of ITU-T SG 16 WP 3 and ISO/IEC JTC 1/SC 29/WG 11, 7th Meeting: San Jose, USA, 9 Jan.-17 Jan. 2014, Document: JCT3V-G1001-v1). In currently design, the DBBP flag is conditionally signaled depending on a transmitted partition mode. The flag is signaled only when the transmitted PartMode equals to the 2N×N partition.

TABLE 1A

| coding_unit( x0, y0, log2CbSize , ctDepth) { | Descriptor | Note |
|---|---|---|
| ... | | |
| if( ( CuPredMode[ x0 ][ y0 ] != MODE_INTRA \|\| log2CbSize = = MinCbLog2SizeY ) && !predPartModeFlag ) | | (1-1) |
|     part_mode | ae(v) | (1-2) |
| if( depth_based_blk_part_flag[ nuh_layer_id ] && PartMode = = PART_2N×N ) | | (1-3) |
|     dbbp_flag[ x0 ][ y0 ] | u(1) | (1-4) |
| .... | | |
| } | | |

As shown in Table 1A, syntax element part_mode is included as indicated by Note (1-2) when the conditions indicated by Note (1-1) are satisfied. When the conditions indicated by Note (1-3) are satisfied, the DBBP flag (i.e., dbbp_flag[x0][y0]) is included as indicated by Note (1-4). The conditions indicated by Note (1-3) correspond to the DBBP flag being present (i.e., depth_based_blk_part+flag [nuh_layer_id]==1) and the partition mode is 2N×N (i.e., PartMode=PART_2N×N). In Table 1A, depth_based_blk_part_flag[layerId] equal to 0 specifies that depth based block partitioning is not used for the layer with nuh_layer_id equal to layerId. depth_based_blk_part_flag[layerId] equal to 1 specifies that depth based block partitioning may be used for the layer with nuh_layer_id equal to layerId. When not present, the value of depth_based_blk_part_flag[layerId] is inferred to be equal to 0. At the decoder side, the DBBP flag (i.e., dbbp_flag[x0][y0]) is parsed. Then, depending on the value of the DBBP flag, the DBBP decoding process will be applied to the current coding unit conditionally. If the DBBP flag indicates the current coding unit being DBBP coded, the DBBP decoding processing is then applied to the current coding unit.

In Table 1A, part_mode specifies partitioning mode of the current coding unit (CU) into one or more prediction units (PUs). The semantics of part_mode depend on CuPredMode [x0][y0] (i.e., the prediction mode of the current block). The variable PartMode is derived from the value of part_mode. In Table 1A, the variable predPartModeFlag specifies whether part_mode is predicted by inter-component prediction. Therefore, the condition "log 2 CbSize==MinCbLog 2 SizeY) && !predPartModeFlag" corresponds to "the current CU is the smallest CU and part_mode is not predicted by inter-component prediction". At the decoder side, the syntax element part_mode is parsed. The prediction partition mode (i.e., PartMode) is determined accordingly. The coding unit is partitioned into one or more prediction units according to the prediction partition mode. The decoding process is then applied to the one or more prediction units.

In 3D-HEVC, the Segment-wise DC Coding (SDC) approach provides an alternative residual coding method. With SDC, the residual data (one or two constant residual values within one PU) is coded without transform and quantization processes. Whether SDC is used is signalled in the coding unit parameters structure at CU level. The partition size of SDC coded CU is always 2N×2N. SDC can be applied to all depth Intra prediction modes including HEVC Intra prediction modes and Depth Modelling Modes (DMM). For HEVC Intra prediction modes, the entire PU is considered as one segment, while for DMM modes, there are two segments. The syntax for the coding unit level related to DBBP and SDC according to the current specification of 3D-HEVC (Gerhard Tech et al, 3*D-HEVC Draft Text* 3, Joint Collaborative Team on 3D Video Coding Extension Development of ITU-T SG 16 WP 3 and ISO/IEC JTC 1/SC 29/WG 11, 7th Meeting: San Jose, USA, 9 Jan.-17 Jan. 2014, Document: JCT3V-G1001) is shown in Table 1B. The coding unit extension syntax is shown in Table 1C.

TABLE 1B

| coding_unit( x0, y0, log2CbSize , ctDepth) { | Descriptor | Note |
|---|---|---|
| ... | | |
| if( slice_type != I ) | | |
|   pred_mode_flag | | |
| if( ( CuPredMode[ x0 ][ y0 ] != MODE_INTRA \|\| log2CbSize = = MinCbLog2SizeY ) && !predPartModeFlag ) | | |
|   part_mode | ae(v) | |
| if( depth_based_blk_part_flag[ nuh_layer_id ] && PartMode = = PART_2N×N ) | | |
|   dbbp_flag[ x0 ][ y0 ] | u(1) | |
| if( sdcEnableFlag ) | | |
|   sdc_flag[ x0 ][ y0 ] | | |
| if( CuPredMode[ x0 ][ y0 ] = = MODE_INTRA ) { | | |
|   if( PartMode = = PART_2Nx2N && pcm_enabled_flag && log2CbSize >= Log2MinIpcmCbSizeY && log2CbSize <= Log2MaxIpcmCbSizeY ) | | |
|     pcm_flag[ x0 ][ y0 ] | | |
|   .... | | |
| } | | |
|   cu_extension( x0, y0 ) | | |
|   .... | | |
| } | | |

TABLE 1C

| cu_extension( x0 , y0 , log2CbSize ) { | Descriptor | Note |
|---|---|---|
|    if ( icEnableFlag ) | | |
|       ic_flag | ae(v) | |
|    if ( rpEnableFlag ) | | |
|       iv_res_pred_weight_idx | ae(v) | |
|    if( cuDepthDcPresentFlag ) { | | |
|       .... | ae(v) | |
|    } | | |
| } | | |

In Table 1B, pcm_flag[x0][y0] equal to 1 specifies that the pcm_sample( ) syntax structure is present and the transform tree( ) syntax structure is not present in the coding unit at the location (x0, y0). pcm_flag[x0][y0] equal to 0 specifies that pcm_sample( ) syntax structure is not present. When pcm_flag[x0][y0] is not present, it is inferred to be equal to 0. PCM (Pulse Coded Modulation) representation is a video coding mode for 3D-HEVC, where the video data is transmitted without transform and prediction. In other words, when the PCM mode is selected (as indicated by pcm_flag[x0][y0]), the video samples (i.e., pcm_sample( )) are transmitted. The value of pcm_flag[x0+i][y0+j] with i=1 . . . nCbS−1, j=1 . . . nCbS−1 is inferred to be equal to pcm_flag[x0][y0], where nCbS corresponds to the CU width.

In the above table, the variable sdcEnableFlag indicates whether the SDC mode is used and the value of sdcEnableFlag is derived as follows.

If CuPredMode[x0][y0] is equal to MODE_INTER, sdcEnableFlag is set equal to (vps_inter_sdc_flag[nuh_layer_id] && PartMode==PART_2N×2N).

Otherwise, if CuPredMode[x0][y0] is equal to MODE_INTRA, sdcEnableFlag is set equal to (vps_depth_modes_flag[nuh_layer_id] && PartMode[x0][y0]==PART_2N×2N).

Otherwise (if CuPredMode[x0][y0] is equal to MODE_SKIP), sdcEnableFlag is set equal to 0

In the above table, sdc_flag[x0][y0] equal to 1 specifies that segment-wise DC (SDC) coding of residual blocks is used for the current coding unit. sdc_flag[x0][y0] equal to 0 specifies that segment-wise DC coding of residual blocks is not used for the current coding unit. When not present, the value of sdc_flag[x0][y0] is inferred to be equal to 0.

Before coding, the residual values are mapped to values, which are present in the original, uncompressed depth map by using a Depth Lookup Table (DLT). Consequently, residual values can be coded by signaling only the index into this lookup table, which reduces the bit depth of residual magnitudes. This mapping table is transmitted to the decoder for the inverse lookup from an index to a valid depth value. The advantage of using this lookup table is the reduced bit depth of the residual index due to sparse depth value occurrences in typical depth maps.

At encoder side SDC process utilizes the mean of the original depth value ($d_{orig}$) and the predicting depth value ($d_{pred}$). As illustrated in the example of FIG. 5A, for SDC (i.e., HEVC Intra prediction modes), $d_{pred}$ is calculated as the average of the left-top, right-top, left-bottom, and right-bottom samples (indicated by circles) in a predicted block. FIG. 5B illustrates an example of DMM Mode 1, where the upper left portion belongs to one segment and the lower-right portion (as indicated by slant lines) belongs to another segment. For SDC (DMM Mode 1), $d_{pred}$ of each segment is derived by the left-top, right-top, left-bottom, and right-bottom samples by (indicated circles) which belong to the same segment in a predicted block. While for SDC (DMM Mode 4), $d_{pred}$ of each segment is set equal to any sample which belongs to the same segment in a predicted block. This is because all samples within one segment share one same prediction value.

BRIEF SUMMARY OF THE INVENTION

A method of signaling depth-based block partitioning (DBBP) for multi-view or three-dimensional (3D) video coding is disclosed. In one embodiment, the DBBP flag is signaled for all candidate prediction modes of the current texture coding unit including a non-2N×N partition mode. The group of candidate prediction modes may consist of 2N×N partition mode and N×2N partition mode. Other groups such as {2N×2N, 2N×N, N×2N and N×N partition modes} and {2N×nU, 2N×nD, nL×2N and nR×2N partition modes} may also be used. The DBBP flag may be signaled in a CU (coding unit) level of the bitstream. The DBBP flag may also be signaled in a CU extension syntax table in the CU level of the bitstream. The prediction partition mode may also be signaled in the CU level of the bitstream. When the prediction partition mode is signaled in the CU level of the bitstream, the DBBP flag may be signaled before or after the prediction partition mode.

In another embodiment, the DBBP flag is signaled for the current texture coding unit not coded in the Intra mode. If the DBBP flag indicates the DBBP being used for the current texture coding unit, DBBP encoding is applied to the current texture coding unit or DBBP decoding is applied to one or more prediction units (PUs) associated with the current texture coding unit to recover the current texture coding unit. If the DBBP flag indicates the DBBP being not used for the current texture coding unit, a prediction partition mode is signaled at an encoder side or parsed at a decoder side from a CU (coding unit) level of the bitstream. The current texture coding unit is partitioned into one or more prediction units according to the prediction partition mode. Predictive encoding or decoding is applied to the one or more prediction units.

BRIEF DESCRIPTION OF THE DRAWINGS

FIG. 5A illustrates an example of HEVC (High Efficient Video Coding) Intra prediction mode for an 8×8 block.

FIG. 5B illustrates an example of DMM (Depth Modeling Mode) Intra prediction mode for an 8×8 block.

DETAILED DESCRIPTION OF THE INVENTION

Figure 1:
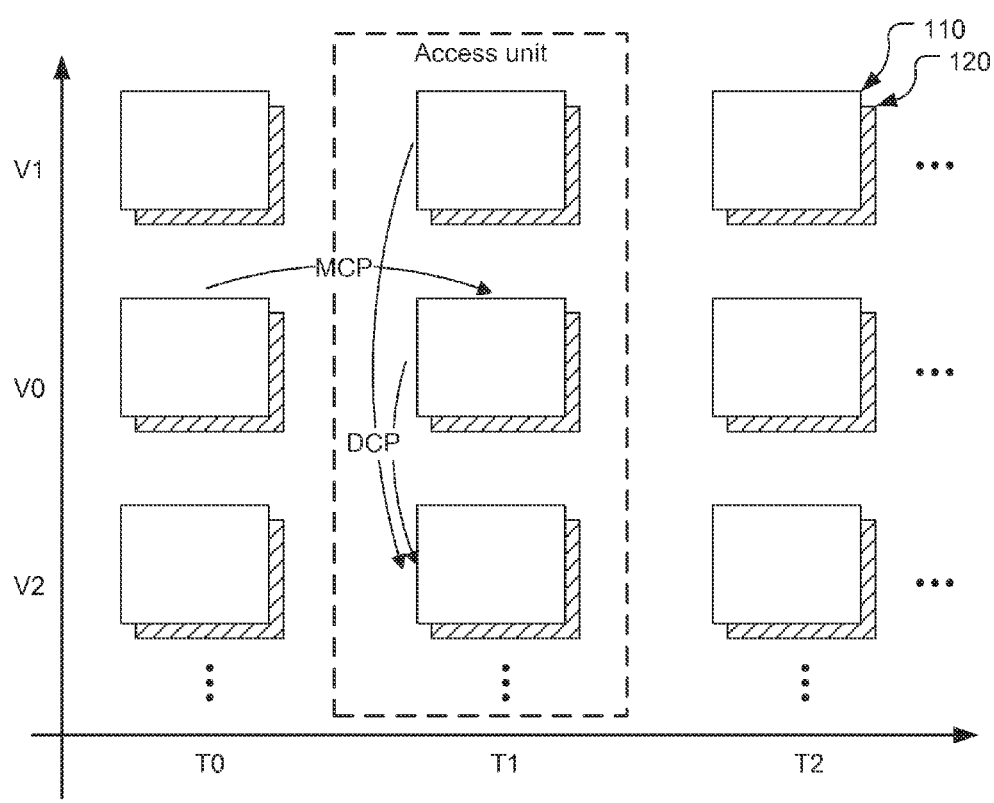
FIG. 1 illustrates an example of three-dimensional/multi-view coding, where motion compensated prediction (MCP) and disparity compensated prediction (DCP) are used
Figure 2:
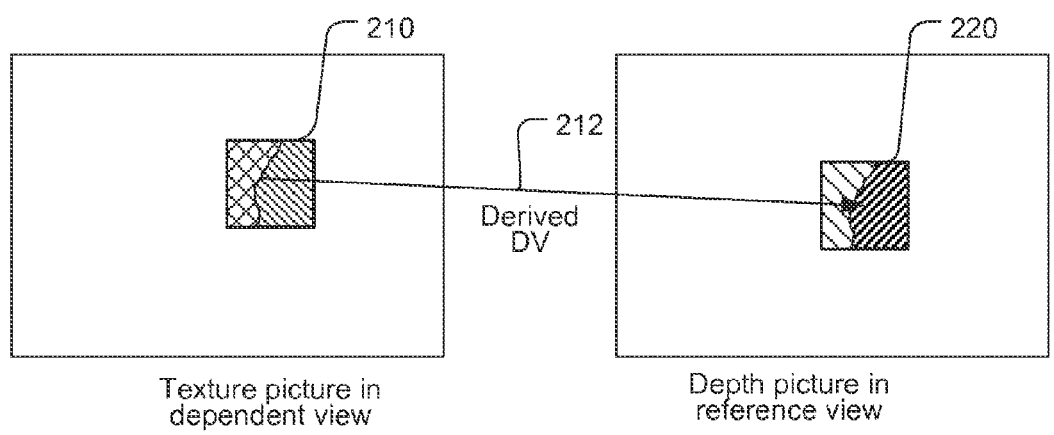
FIG. 2 illustrates an exemplary derivation process to derive a corresponding depth block in a reference view for a current texture block in a dependent view.
Figure 3:
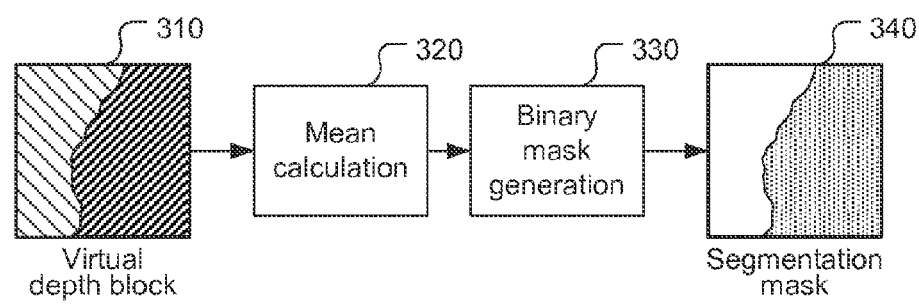
FIG. 3 illustrates an exemplary derivation process to generate the segmentation mask based on the corresponding depth block in a reference view for a current texture block in a dependent view.
Figure 4:
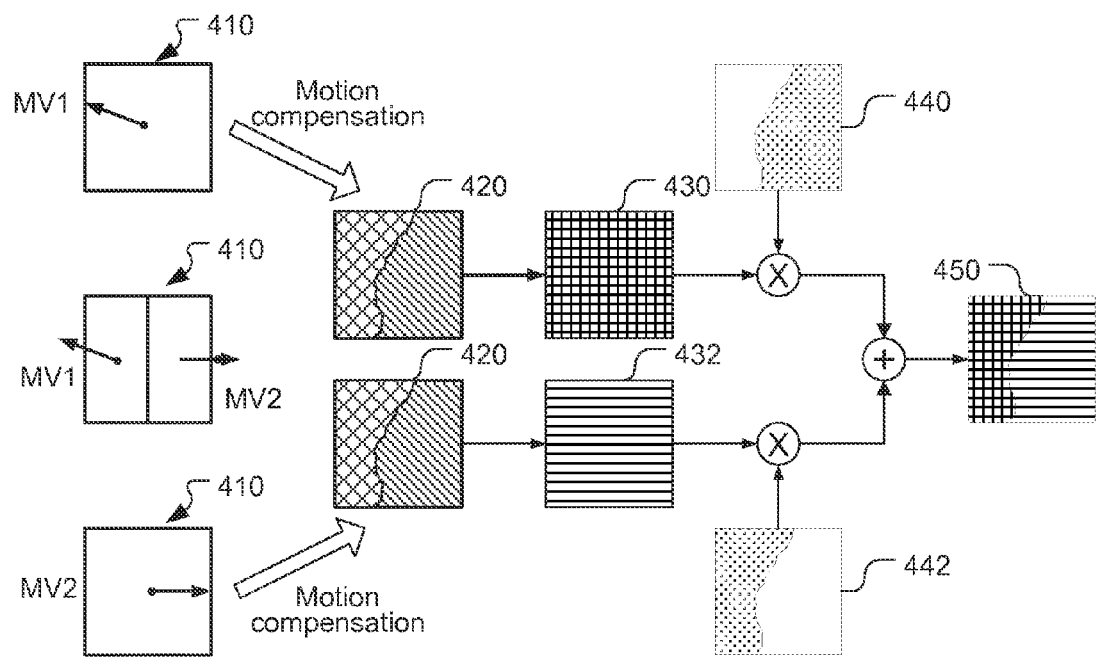
FIG. 4 illustrates an exemplary processing flow for 3D or multi-view coding using depth-based block partitioning (DBBP).

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In current DBBP syntax design, in order to signal the DBBP mode, encoder firstly needs to signal a 2N×N partition mode to a decoder and then transmit a DBBP flag as shown in Table 1A. The signaling of the 2N×N partition mode is actually unnecessary, since the real partition mode of DBBP is implicitly derived from a corresponding depth block. In order to overcome this redundancy issue, various embodiments are disclosed to use modified signaling designs.

Embodiment 1. The dependence on 2N×N partition mode in DBBP flag signaling is removed as shown in the example of Table 2. In Table 2, the syntax highlighted by lined box as indicated by Note (2-1) is replace by the new syntax indicated by Note (2-2). According to the modified syntax design in Table 2, flag dbbp_flag[x0][y0] will not be incorporated for the case PartMode==PART_2N×N.

TABLE 2

| coding_unit( x0, y0, log2CbSize , ctDepth) { | Descriptor | Note |
|---|---|---|
| ... | | |
| if( ( CuPredMode[ x0 ][ y0 ] != MODE_INTRA \|\| log2CbSize = = MinCbLog2SizeY ) && !predPartModeFlag ) | | |

TABLE 2-continued

| coding_unit( x0, y0, log2CbSize , ctDepth) { | Descriptor | Note |
|---|---|---|
| part_mode | ae(v) | |
| if( depth_based_blk_part_flag[ nuh_layer_id] && PartMode = = PART_2NxN) | | (2-1) |
| if( depth_based_blk_part_flag[ nuh_layer_id ] ) | | (2-2) |
| dbbp_flag[ x0 ][ y0 ] | u(1) | |
| ... | | |
| } | | |

Embodiment 2. In DBBP, the signaling of partition mode is unnecessary since the partition mode can be implicitly derived from the depth block. Accordingly, the signaling of partition mode syntax when the DBBP is enabled is skipped to further remove the redundancy. An example of syntax design for coding unit is shown in Table 3.

TABLE 3

| coding_unit( x0, y0, log2CbSize , ctDepth) { | Descriptor | Note |
|---|---|---|
| ... | | |
| if( depth_based_blk_part_flag[ nuh_layer_id ] && && CuPredMode[x0][y0] != MODE_INTRA) | | (3-1) |
| dbbp_flag[ x0 ][ y0 ] | u(1) | (3-2) |
| if( ( CuPredMode[ x0 ][ y0 ] != MODE_INTRA \|\| | | (3-3) |
| log2CbSize = = MinCbLog2SizeY ) && !predPartModeFlag && !dbbp_flag[x0][y0] ) | | |
| part_mode | ae(v) | (3-4) |
| ... | | |
| } | | |

In Table 3, flag dbbp_flag[x0][y0] is signaled as indicated by Note (3-2) only when conditions indicate the DBBP flag being present and the block being non-Intra coded by Note (3-1) are satisfied. Furthermore, an additional condition to incorporate syntax part_mode in Note (3-4) is that flag dbbp_flag[x0][y0] indicates the DBBP mode is not used as indicated by Note (3-3).

Embodiment 3. When a current coding unit is coded with the DBBP mode, the corresponding partition size is set to SIZE 2N×2N and bi-prediction is inherited. Therefore, the DBBP flag is signaled only when the transmitted partition mode is 2N×2N partition mode. An example of signaling the DBBP flag (Note (4-2) in Table 4) when the partition mode is 2N×2N (Note (4-1) in Table 4) is shown in Table 4.

TABLE 4

| coding_unit( x0, y0, log2CbSize , ctDepth) { | Descriptor | Note |
|---|---|---|
| ... | | |
| if( ( CuPredMode[ x0 ][ y0 ] != MODE_INTRA \|\| | | |
| log2CbSize = = MinCbLog2SizeY ) && !predPartModeFlag ) | | |
| part_mode | ae(v) | |
| if( depth_based_blk_part_flag[ nuh_layer_id ] && PartMode = = PART_2Nx2N ) | | (4-1) |
| dbbp_flag[ x0 ][ y0 ] | u(1) | (4-2) |
| ... | | |
| } | | |

Embodiment 4. In this embodiment, the DBBP flag is signaled only when the transmitted partition mode with the longest binarization codeword is transmitted. An example is shown in Table 5, where the DBBP flag is signaled when the transmitted partition mode equal to an AMPxxx mode (i.e., PART_2N×nU, PART_2N×nD, PART_nL×2N or PART nR×2N).

TABLE 5

| coding_unit( x0, y0, log2CbSize , ctDepth) { | Descriptor | Note |
|---|---|---|
| ... | | |
| if( ( CuPredMode[ x0 ][ y0 ] != MODE_INTRA \|\| | | |
|   log2CbSize = = MinCbLog2SizeY ) && | | |
|   !predPartModeFlag) | | |
|   part_mode | ae(v) | |
| if( depth_based_blk_part_flag[ nuh_layer_id ] && | | (5-1) |
|   PartMode = = PART_AMPxxx ) | | |
|   dbbp_flag[ x0 ][ y0 ] | ae(v) | (5-2) |
|   .... | | |
| } | | |

As shown in Table 5, flag dbbp_flag[x0][y0] is signaled as indicated by Note (5-2) when conditions indicated by Note (5-1) are satisfied, where the conditions correspond to depth_based_blk_part_flag[nuh_layer_id] indicating the DBBP flag being present and the partition mode being one of the AMP modes.

Embodiment 5. In this embodiment, the transmission of the DBBP flag does not depend on the transmitted partition mode. The DBBP flag is always signaled as long as the DBBP mode is enabled in current coding slice or picture. For example, flag depth_based_blk_part_flag[nuh_layer_id] can be used to specify whether the depth based block partitioning is used or not for the current layer. If the flag has a value indicating DBBP being used as indicated by Note (6-3) in Table 6, the dbbp_flag[x0][y0] is always signaled as indicated by Note (6-4) in Table 6. The conditions for incorporating part_mode are indicated by Note (6-2), which are the same as the conditions of these indicated by Note (1-1) of Table 1A.

TABLE 6

| coding_unit( x0, y0, log2CbSize , ctDepth) { | Descriptor | Note |
|---|---|---|
| ... | | |
| if( ( CuPredMode[ x0 ][ y0 ] != MODE_INTRA \|\| | | (61) |
|   log2CbSize = = MinCbLog2SizeY) && | | |
|   !predPartModeFlag) | | |
|   part_mode | ae(v) | (6-2) |
| if( depth_based_blk_part_flag[ nuh_layer_id ] ) | | (6-3) |
|   dbbp_flag[ x0 ][ y0 ] | ae(v) | (6-4) |
|   .... | | |
| } | | |

Embodiment 6. In the DBBP mode, the mask for block segmentation and the partition for motion storage are implicitly derived based on the corresponding depth block, the transmission of partition mode can be skipped when it is coded in a DBBP mode. In this embodiment, the DBBP flag is transmitted before the partition flag. When the DBBP mode is enabled, the transmission of the partition flag is skipped. An example is shown in Table 7.

TABLE 7

| coding_unit( x0, y0, log2CbSize , ctDepth) { | Descriptor | Note |
|---|---|---|
| ... | | |
| if( depth_based_blk_part_flag[ nuh_layer_id ] ) | | |
|   dbbp_flag[ x0 ][ y0 ] | ae(v) | |
| if( ( CuPredMode[ x0 ][ y0 ] != MODE_INTRA \|\| | | |
|   log2CbSize = = MinCbLog2SizeY ) && | | |
|   !predPartModeFlag | | |
|   && !dbbp_flag[x0][y0] ) | | |
|   part_mode | ae(v) | |
|   .... | | |
| } | | |

Embodiment 7. In this embodiment, the DBBP flag and the partition flag are both transmitted. When the DBBP mode is enabled, the partition flag is used to represent the partition for motion information storage in DBBP and is not used to represent the partition of motion compensation. The examples are shown in Table 6 and Table 8.

TABLE 8

| coding_unit( x0, y0, log2CbSize , ctDepth) { | Descriptor | Note |
|---|---|---|
| ... | | |
| if( depth_based_blk_part_flag[ nuh_layer_id ] ) | | |
|   dbbp_flag[ x0 ][ y0 ] | ae(v) | |
| if( ( CuPredMode[ x0 ][ y0 ] != MODE_INTRA \|\| | | |
|   log2CbSize = = MinCbLog2SizeY ) && | | |
|   !predPartModeFlag) | | |
|   part_mode | ae(v) | |
|   .... | | |
| } | | |

Embodiment 8. In this embodiment, the DBBP flag is transmitted when current CU is not predicted by an Intra mode. When the current CU is Intra predicted, dbbp_flag is not transmitted. An example is shown in Table 9.

TABLE 9

| coding_unit( x0, y0, log2CbSize , ctDepth) { | Descriptor | Note |
|---|---|---|
| ... | | |
| if( depth_based_blk_part_flag[ nuh_layer_id ] | | |
|   && && CuPredMode[x0][y0] != | | |
|   MODE_INTRA) | | |
|   dbbp_flag[ x0 ][ y0 ] | ae(v) | |
| if( ( CuPredMode[ x0 ][ y0 ] != MODE_INTRA \|\| | | |
|   log2CbSize = = MinCbLog2SizeY ) && | | |
|   !predPartModeFlag) | | |
|   part_mode | ae(v) | |
|   .... | | |
| } | | |

In the above examples, since the DBBP will implicitly divide a current coding block into multiple partitions (e.g., 2 or 4 partitions) for prediction process, it needs to ensure that the PU level syntax will be parsed correctly according to the number of partitions. To solve this issue, some semantic constraint could be added to the "part_mode". For example, the partition mode for a CU with dbbp_flag equal to 1 is set to a partition type with multiple (2 or 4) partitions (e.g., PART_2N×N, PART_N×2N, PART_N×N, or AMP partitions). For example, the semantic description of "part_mode" in the specification of 3D-HEVC (Gerhard Tech et al, 3D-HEVC Draft Text 3, Joint Collaborative Team on 3D Video Coding Extension Development of ITU-T SG 16 WP 3 and ISO/IEC JTC 1/SC 29/WG 11, 7th Meeting: San Jose, USA, 9 Jan.-17 Jan. 2014, Document: JCT3V-G1001-v1) can be modified. Syntax part_mode specifies partitioning mode of the current coding unit, where the semantics of part_mode depend on CuPredMode[x0][y0]. The variables PartMode and IntraSplitFlag are derived from the value of part_mode and partPredIdc as defined in Table 10. When dbbp_flag is equal to 1, PartMode is explicitly derived as PART_2N×N.

TABLE 10

| CuPredMode[x0][y0] | part_mode | partPredIdc | IntraSplitFlag | PartMode |
|---|---|---|---|---|
| MODE_INTRA | 0 | — | 0 | PART_2Nx2N |
|  | 1 | — | 1 | PART_NxN |
| MODE_INTER | 0 | — | 0 | PART_2Nx2N |
|  | 1 | 0 | 0 | PART_2NxN |
|  | 1 | 1 | 0 | PART_2NxN |
|  | 1 | 2 | 0 | PART_Nx2N |
|  | 2 | 0 | 0 | PART_Nx2N |
|  | 2 | 1 | 0 | PART_2NxnU |
|  | 2 | 2 | 0 | PART_nLx2N |
|  | 3 | 0 | 0 | PART_NxN |
|  | 3 | 1 | 0 | PART_2NxnD |
|  | 3 | 2 | 0 | PART_nRx2N |
|  | 4 | — | 0 | PART_2NxnU |
|  | 5 | — | 0 | PART_2NxnD |
|  | 6 | — | 0 | PART_nLx2N |
|  | 7 | — | 0 | PART_nRx2N |

Another way to solve this issue is to add condition to the parsing stage. For example, when DBBP divides a current block into two partitions, it may need to parse two or four PU level syntax elements.

The existing syntax design for the SDC mode, DBBP mode, and PCM mode in 3D video coding may not be very efficient. Another aspect of the present invention is to improve the efficiency of existing syntax design.

Embodiment 9. In this embodiment, the PCM flag is signaled only when the SDC mode is not enabled as an example shown in Table 11. The addition condition (i.e., &&!sdc_flag[x0][y0]) is indicated by Note (11-1).

TABLE 11

| coding_unit( x0, y0, log2CbSize , ctDepth) { | Descriptor | Note |
|---|---|---|
| if( slice_type != I ) |  |  |
|   pred_mode_flag |  |  |
| if( ( CuPredMode[ x0 ][ y0 ] != MODE_INTRA \|\| log2CbSize = = MinCbLog2SizeY ) && !predPartModeFlag ) | ae(v) |  |
|   part_mode |  |  |
| if( depth_based_blk_part_flag[ nuh_layer_id ] && PartMode = = PART_2NxN) | ae(v) |  |
|   dbbp_flag[ x0 ][ y0 ] |  |  |
| if( sdcEnableFlag ) |  |  |
|   sdc_flag[ x0 ][ y0 ] |  |  |
| if( CuPredMode[ x0 ][ y0 ] = = MODE_INTRA ) { |  |  |
|   if( PartMode = = PART_2Nx2N && pcm_enabled_flag && log2CbSize >= Log2MinIpcmCbSizeY && | | (11-1) |

TABLE 11-continued

| coding_unit( x0, y0, log2CbSize , ctDepth) { | Descriptor | Note |
|---|---|---|
|   log2CbSize <= Log2MaxIpcmCbSizeY && ! sdc_flag[ x0 ][ y0 ]) |  |  |
|   pcm_flag[ x0 ][ y0 ] |  |  |
| .... |  |  |
| } |  |  |
| } |  |  |

Embodiment 10. In this embodiment, the SDC flag is signaled in CU extension. The SDC flag is signaled only when the PCM mode is not enabled as shown in the example of Table 12. As shown in Table 12, the SDC flag is signaled as indicated by Note (12-2) when SDC enable flag (i.e., sdcEnableFlag) has a value of 1 and pcm_flag[x0][y0] has a value of 0 as indicated by Note (12-1).

TABLE 12

| cu_extension( x0 , y0 , log2CbSize ) { | Descriptor | Note |
|---|---|---|
| if ( icEnableFlag ) |  |  |
|   ic_flag | ae(v) |  |
| if ( rpEnableFlag ) |  |  |
|   iv_res_pred_weight_idx | ae(v) |  |
| if( sdcEnableFlag && !pcm_flag[ x0 ][ y0 ] ) |  | (12-1) |
|   sdc_flag[ x0 ][ y0 ] |  | (12-2) |
| if( cuDepthDcPresentFlag ) { |  |  |
|   .... | ae(v) |  |
| } |  |  |
| } |  |  |

Embodiment 11. In this embodiment, the DBBP flag is signaled in CU extension. The DBBP flag can be skipped when the DBBP mode is disabled in current slice, picture, view, layer or sequence level, when the current CU mode is Intra mode or not Inter mode, or when the PCM mode is enabled. An example is shown in Table 13. The corresponding syntax is indicated by Notes (13-1) and (13-2).

TABLE 13

| cu_extension( x0 , y0 , log2CbSize ) { | Descriptor | Note |
|---|---|---|
|   if ( icEnableFlag ) | | |
|     ic_flag | ae(v) | |
|   if ( rpEnableFlag ) | | |
|     iv_res_pred_weight_idx | ae(v) | |
|   if( depth_based_blk_part_flag[ nuh_layer_id ] | | (13-1) |
|   && | | |
|     CuPredMode[ x0 ][ y0 ] != MODE_INTRA) | | |
|     dbbp_flag[ x0 ][ y0 ] | | (13-2) |
|   if( cuDepthDcPresentFlag ) { | | |
|     .... | ae(v) | |
|   } | | |
| } | | |

Embodiment 12. In this embodiment, the SDC flag and DBBP flag are both signaled in CU extension. The SDC flag is signaled only when the PCM mode is not enabled. The DBBP flag can be skipped when the DBBP mode is disabled in the current slice, picture, view, layer, or sequence level, or when the current CU mode is Intra mode or not Inter mode, or when the PCM mode is enabled. An example is shown in Table 14, where the additional syntax is incorporated as indicated by Notes (14-1) to (14-4).

TABLE 14

| cu_extension( x0 , y0 , log2CbSize ) { | Descriptor | Note |
|---|---|---|
|   if ( icEnableFlag ) | | |
|     ic_flag | ae(v) | |
|   if ( rpEnableFlag ) | | |
|     iv_res_pred_weight_idx | ae(v) | |
|   if( sdcEnableFlag && !pcm_flag[ x0 ][ y0 ] ) | | (14-1) |
|     sdc_flag[ x0 ][ y0 ] | | (14-2) |
|   if( depth_based_blk_part_flag[ nuh_layer_id ] | | (14-3) |
|   && | | |
|     CuPredMode[ x0 ][ y0 ] != MODE_INTRA) | | |
|     dbbp_flag[ x0 ][ y0 ] | | (14-4) |
|   if( cuDepthDcPresentFlag ) { | | |
|     .... | ae(v) | |
|   } | | |
| } | | |

Embodiment 13. In this embodiment, the SDC flag is signaled only when the DBBP mode is not enabled and the DBBP mode is signaled only when the SDC mode is not enabled. The SDC flag and DBBP flag can be signaled in CU or CU extension syntax. As shown in Table 15, the SDC flag is signaled before the DBBP flag and the DBBP mode needs to be signaled only when the SDC mode in not enabled as indicated by Notes (15-1) to (15-4).

TABLE 15

| cu_extension( x0 , y0 , log2CbSize ) { | Descriptor | Note |
|---|---|---|
|   if ( icEnableFlag ) | | |
|     ic_flag | ae(v) | |
|   if ( rpEnableFlag ) | | |
|     iv_res_pred_weight_idx | ae(v) | |
|   if( sdcEnableFlag && !pcm_flag[ x0 ][ y0 ] ) | | (15-1) |
|     sdc_flag[ x0 ][ y0 ] | | (15-2) |
|   if( depth_based_blk_part_flag[ nuh_layer_id ] | | (15-3) |
|   && | | |

TABLE 15-continued

| cu_extension( x0 , y0 , log2CbSize ) { | Descriptor | Note |
|---|---|---|
|     CuPredMode[ x0 ][ y0 ] != MODE_INTRA && !sdc_flag[ x0 ][ y0 ]) | | |
|     dbbp_flag[ x0 ][ y0 ] | | (15-4) |
|   if( cuDepthDcPresentFlag ) { | | |
|     .... | ae(v) | |
|   } | | |
| } | | |

Embodiment 14. In this embodiment, the initial probabilities in initial CABAC step for DBBP flag are all 161 for B-slice/picture, P-slice/picture, and I-slice/picture as below.

```
static const UChar
INIT_DBBP_FLAG[3][DBBP_NUM_FLAG_CTX] =
{
  { 161 },
  { 161 },
  { 161 },
}.
```

While, the initial probabilities in initial CABAC step for DBBP flag are 161 for B-slice/picture, P-slice/picture, and I-slice/picture, other probability values may also be used. For example, the values for B-slice/picture, P-slice/picture, and I-slice/picture can all be 162, 192, or 176. In yet another example, the values for B-slice/picture, P-slice/picture, and I-slice/picture can also be different. For example, the values for B-slice/picture, P-slice/picture, and I-slice/picture can be 192, 176 and 176 respectively.

Additional embodiments regarding the syntax design for dbbp_flag and part_mode with various conditions are also disclosed. In one type of embodiments, dbbp_flag is transmitted after part_mode when certain conditions are satisfied. The conditions may correspond to:
1. part_mode specifies a 2N×N or N×2N prediction unit (PU) partition, or
2. part_mode specifies a prediction unit partition belonging to a subset of {2N×2N, N×2N, 2N×N, N×N, 2N×nU, 2N×nD, nL×2N and nR×2N}.

When the dbbp_flag is transmitted after the part_mode, the dbbp_flag can be signalized in the cu_extention syntax table when certain conditions are satisfied. The conditions may correspond to:
1. The current prediction mode is not Intra and part_mode only identifies two partition patterns for DBBP, e.g., N×2N or 2N×N, or
2. The current prediction mode is not Intra and part_mode does not identify 2N×2N or N×N PU partition.

In another type of embodiments, the dbbp_flag is transmitted before the part_mode. The syntax signaling may be conditional or includes variations from other embodiments disclosed above. Some examples are listed as follows.
1. The part_mode is transmitted only when dbbp_flag is not equal to 1. In this case, the prediction partition which DBBP utilizes is derived from a virtual depth block.
2. If the dbbp_flag is equal to 1, the part_mode only identifies one of two partition patterns for DBBP, i.e., N×2N or 2N×N. For example, part_mode equal to 1 may correspond to 2N×N DBBP.
3. The binarization of part_mode is different for different dbbp_flag values.

4. The context for coding part_mode is different for different dbbp_flag values.

In yet another embodiment, when dbbp_flag is equal to 1, the PU partition that the part_mode identifies only the prediction partition for DBBP. Any of the types of embodiments listed above can be combined.

The performance of a 3D or multi-view video coding system incorporating an embodiment of the present invention is compared to the performance of a conventional system based on HTM-10.0 as shown in Tables 16-17. Table 16 corresponds to the result for a system incorporating the first embodiment of the present invention. Table 17 corresponds to the result for a system incorporating the second embodiment of the present invention. A negative value in the BD-rate implies the new system has better perform than the anchor system. The BD-rate differences for texture pictures in view 1 (video 1), view 2 (video 2), texture video only (video/video bitrate), the total bitrate (texture bitrate and depth bitrate) for texture video (video/total bitrate) and the total bitrate for coded and synthesized video (Synth/total bitrate) are small in all cases. The run times in terms of encoding time, decoding time and rendering time are about the same. Therefore, the first and second embodiments according to the present invention can simplify the syntax signaling and processing without any penalty of performance loss.

Figure 6:
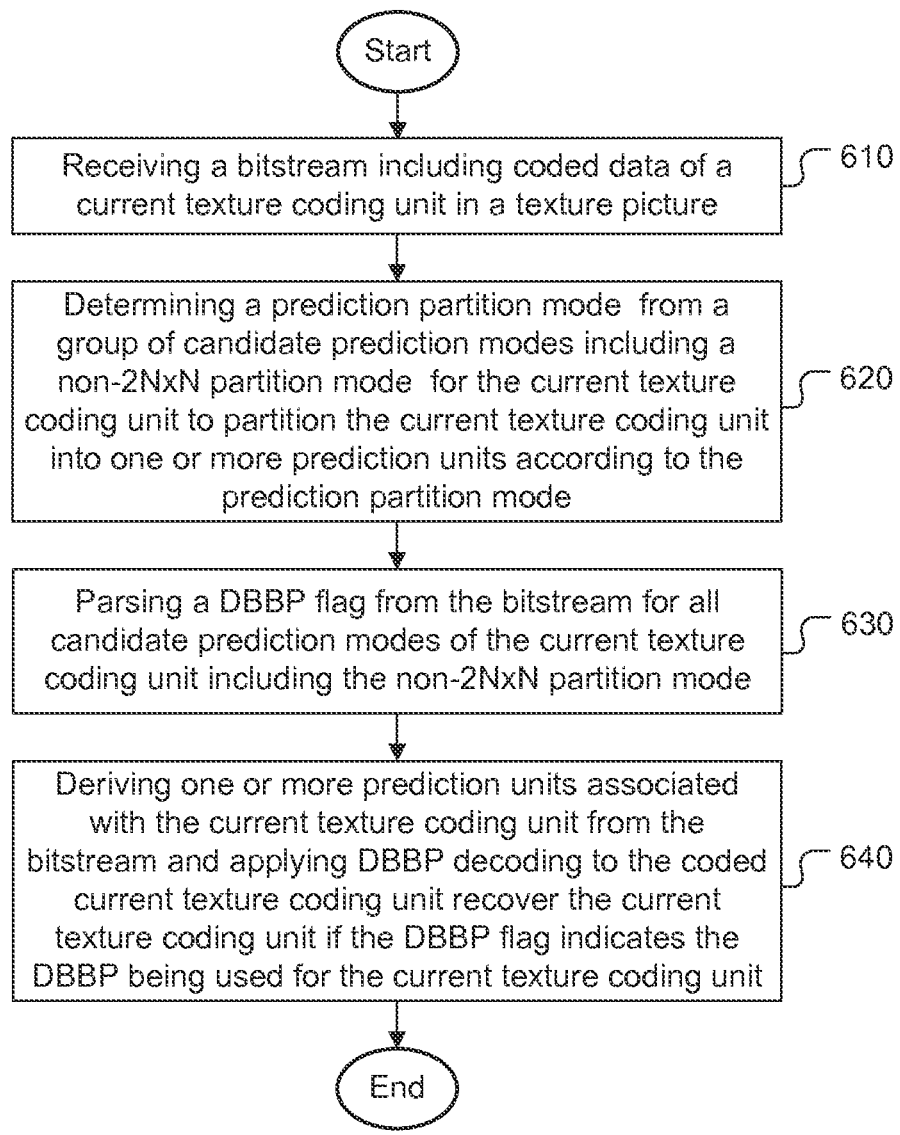
FIG. 6 illustrates a flowchart of an exemplary decoding system incorporating an embodiment of the present invention to signal depth-based block partitioning (DBBP) flag for all prediction partition modes of the current coding unit.

FIG. 6 illustrates a flowchart of an exemplary decoding system incorporating an embodiment of the present invention to signal depth-based block partitioning (DBBP) flag for all prediction partition modes of the current coding unit. The system receives a bitstream including coded data of a current texture coding unit in a texture picture as shown in step 610. The bitstream may be retrieved from memory (e.g., computer memory, buffer (RAM or DRAM) or other media) or from a processor. A prediction partition mode from a group of candidate prediction modes including a non-2N×N partition mode is determined for the current texture coding unit to partition the current texture coding unit into one or more prediction units according to the prediction partition mode in step 620. A DBBP flag is parsed from the bitstream for all candidate prediction modes of the current texture coding unit including the non-2N×N partition mode in step 630. If the DBBP flag indicates the DBBP being used for the current texture coding unit, one or more prediction units (PUs) associated with the current texture coding unit is derived from the bitstream and DBBP decoding is applied to the coded current texture coding unit to recover the current texture coding unit in step 640.

Figure 7:
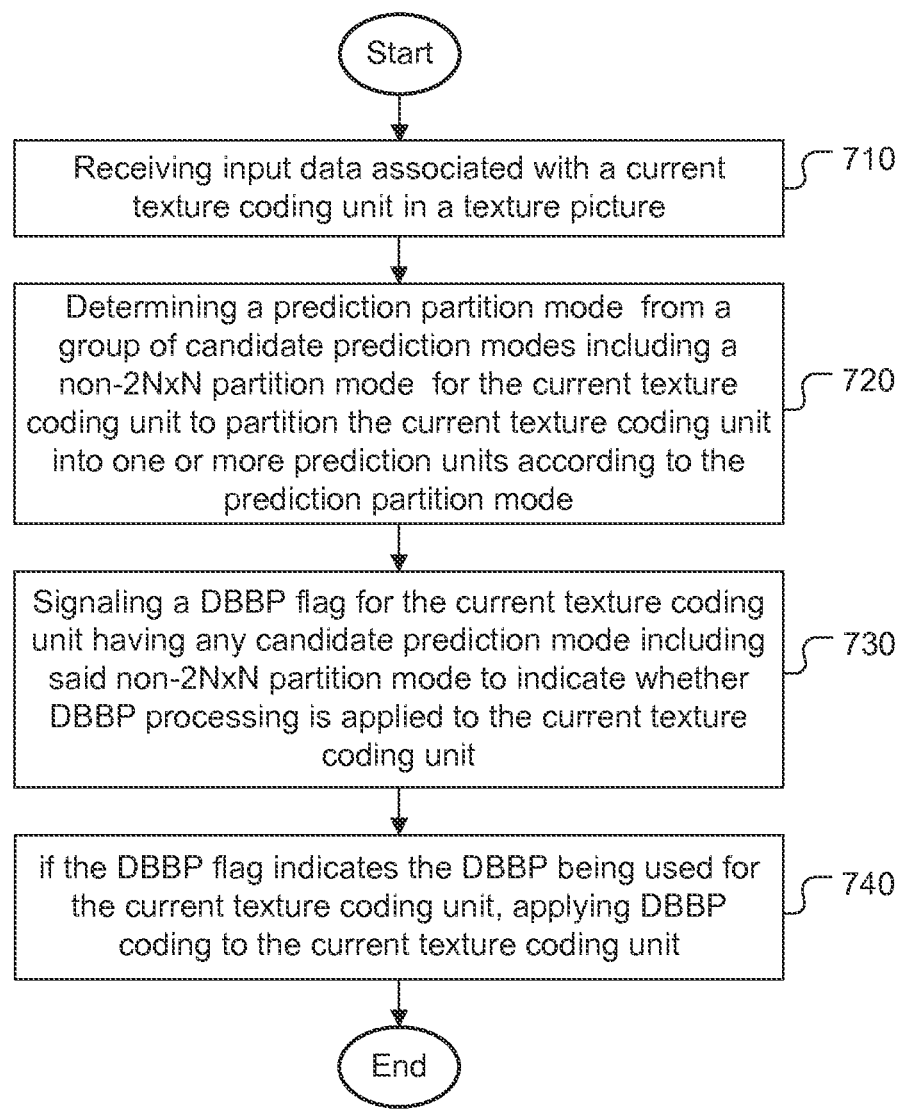
FIG. 7 illustrates a flowchart of an exemplary encoding system incorporating an embodiment of the present invention to signal depth-based block partitioning (DBBP) flag for all prediction partition modes of the current coding unit.

FIG. 7 illustrates a flowchart of an exemplary encoding system incorporating an embodiment of the present invention to signal depth-based block partitioning (DBBP) flag for all prediction partition modes of the current coding unit. Input data associated with a current texture coding unit in a texture picture is received in step 710. The input data may be retrieved from memory (e.g., computer memory, buffer (RAM or DRAM) or other media) or from a processor. A prediction partition mode from a group of candidate prediction modes including a non-2N×N partition mode is determined for the current texture coding unit to partition the current texture coding unit into one or more prediction units according to the prediction partition mode in step 720. A DBBP flag is signaled for the current texture coding unit having any candidate prediction mode including said non-2N×N partition mode to indicate whether DBBP processing is applied to the current texture coding unit in step 730. If the DBBP flag indicates the DBBP being used for the current texture coding unit, DBBP coding is applied to the current texture coding unit in step 740.

Figure 8:
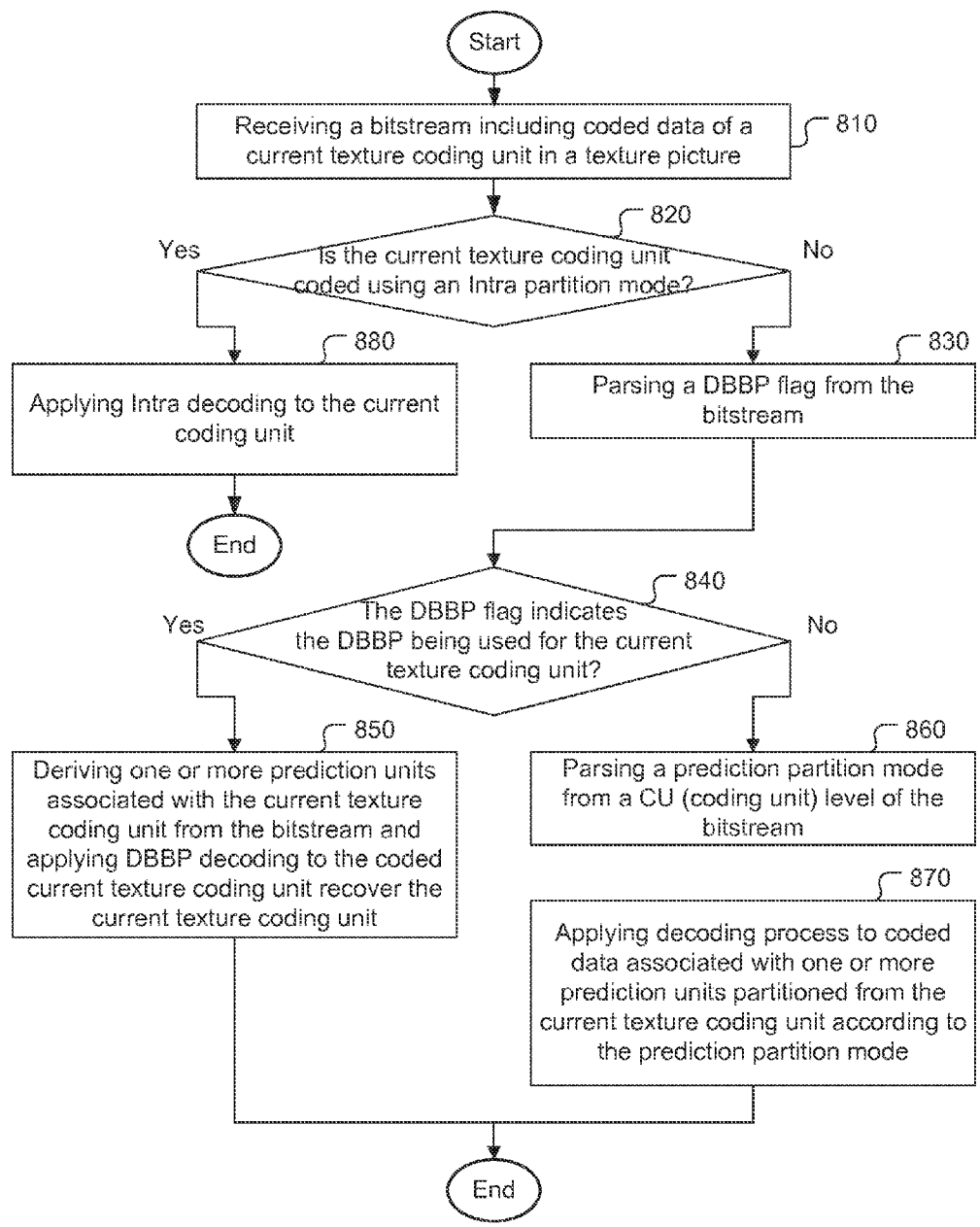
FIG. 8 illustrates a flowchart of an exemplary decoding system incorporating an embodiment of the present invention, where the prediction partition mode is not signaled if the depth-based block partitioning (DBBP) flag indicates the DBBP being used for the current coding unit.

FIG. 8 illustrates a flowchart of an exemplary decoding system incorporating an embodiment of the present invention, where the prediction partition mode is not signaled if the depth-based block partitioning (DBBP) flag indicates the

TABLE 16

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.00% | 0.15% | −0.19% | 0.00% | 0.00% | 0.01% | 100.0% | 99.1% | 99.5% |
| Kendo | 0.00% | 0.01% | −0.14% | −0.03% | −0.03% | 0.05% | 100.4% | 99.7% | 105.6% |
| Newspapercc | 0.00% | 0.13% | −0.08% | 0.01% | −0.01% | −0.03% | 100.7% | 98.4% | 100.5% |
| GhostTownFly | 0.00% | 0.15% | 0.03% | 0.01% | 0.02% | 0.03% | 101.6% | 101.8% | 99.0% |
| PoznanHall2 | 0.00% | −0.01% | −0.43% | −0.04% | −0.05% | −0.20% | 97.0% | 95.6% | 101.8% |
| PoznanStreet | 0.00% | −0.06% | 0.10% | 0.01% | 0.01% | 0.01% | 99.3% | 94.1% | 102.3% |
| UndoDancer | 0.00% | 0.12% | 0.08% | 0.02% | 0.02% | 0.09% | 100.1% | 99.1% | 97.9% |
| Shark | 0.00% | 0.06% | 0.17% | 0.03% | 0.03% | 0.02% | 101.4% | 101.4% | 100.4% |
| 1024 × 768 | 0.00% | 0.10% | −0.14% | 0.00% | −0.01% | 0.01% | 100.4% | 99.1% | 101.9% |
| 1920 × 1088 | 0.00% | 0.05% | −0.01% | 0.01% | 0.01% | −0.01% | 99.9% | 98.4% | 100.3% |
| average | 0.00% | 0.07% | −0.06% | 0.00% | 0.00% | 0.00% | 100.1% | 98.7% | 100.9% |

TABLE 17

|  | Video 0 | Video 1 | Video 2 | Video PSNR/ video bitrate | Video PSNR/ total bitrate | Synth PSNR/ total bitrate | Enc time | Dec time | Ren time |
| --- | --- | --- | --- | --- | --- | --- | --- | --- | --- |
| Balloons | 0.00% | 0.09% | 0.02% | 0.02% | 0.04% | 0.03% | 100.5% | 99.1% | 100.4% |
| Kendo | 0.00% | −0.21% | −0.11% | −0.05% | −0.06% | −0.09% | 100.5% | 98.9% | 104.7% |
| Newspapercc | 0.00% | 0.07% | −0.09% | 0.00% | −0.01% | −0.03% | 100.7% | 98.6% | 101.7% |
| GhostTownFly | 0.00% | −0.06% | −0.07% | −0.01% | −0.01% | 0.04% | 101.8% | 100.2% | 99.0% |
| PoznanHall2 | 0.00% | 0.00% | −0.33% | −0.03% | −0.04% | −0.16% | 98.0% | 99.2% | 100.5% |
| PoznanStreet | 0.00% | 0.08% | 0.01% | 0.00% | 0.00% | 0.01% | 100.0% | 96.2% | 99.3% |
| UndoDancer | 0.00% | −0.06% | 0.03% | 0.00% | 0.00% | 0.02% | 99.2% | 98.2% | 98.0% |
| Shark | 0.00% | 0.03% | 0.00% | 0.00% | 0.00% | 0.01% | 99.9% | 100.9% | 101.8% |
| 1024 × 768 | 0.00% | −0.01% | −0.06% | −0.01% | −0.01% | −0.03% | 100.6% | 98.9% | 102.2% |
| 1920 × 1088 | 0.00% | 0.00% | −0.07% | −0.01% | −0.01% | −0.02% | 99.8% | 98.9% | 99.7% |
| average | 0.00% | −0.01% | −0.07% | −0.01% | −0.01% | −0.02% | 100.1% | 98.9% | 100.7% |

DBBP being used for the current coding unit. The system receives a bitstream including coded data of a current texture coding unit in a texture picture as shown in step 810. A test is performed to determine whether the current texture coding unit is coded using an Intra partition mode in step 820. If the result is "Yes", step 880 is performed. If the result is "No", step 830 is performed. In step 830, a DBBP flag is parsed from the bitstream and the result is test in step 840. In step 840, a test regarding whether the DBBP flag indicates the DBBP being used for the current texture coding unit. If the result of step 840 is "Yes", step 850 is performed. If the result of step 840 is "No", steps 860 and 870 are performed. In step 850, one or more prediction units (PUs) associated with the current texture coding unit is derived from the bitstream and DBBP decoding is applied to the coded current texture coding unit to recover the current texture coding unit. The process is terminated after step 850. In step 860, a prediction partition mode is parsed from a CU (coding unit) level of the bitstream. In step 870, decoding process is applied to coded data associated with one or more prediction units partitioned from the current texture coding unit according to the prediction partition mode. The process is terminated after step 870. In step 880, Intra decoding is applied to the current coding unit and the process is terminated after step 880.

The flowcharts shown above are intended to illustrate examples of depth-based block partitioning (DBBP) according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments.

Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced. The present invention can be applied to 3D HEVC as well as 3D AVS (Audio Video Standard).

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of signaling depth-based block partitioning (DBBP) for multi-view or three-dimensional (3D) video decoding, the method comprising:
   receiving a bitstream including coded data of a current texture coding unit in a texture picture;
   determining a prediction partition mode from a group of candidate prediction modes including a non-2N×N partition mode for the current texture coding unit to partition the current texture coding unit into one or more prediction units according to the prediction partition mode;
   parsing a DBBP flag from the bitstream for all candidate prediction modes of the current texture coding unit including the non-2N×N partition mode; and
   if the DBBP flag indicates the DBBP being used for the current texture coding unit, deriving one or more prediction units associated with the current texture coding unit from the bitstream and applying DBBP decoding to the coded current texture coding unit to recover the current texture coding unit.

2. The method of claim 1, wherein the group of candidate prediction modes consists of 2N×N partition mode and N×2N partition mode.

3. The method of claim 1, wherein the group of candidate prediction modes consists of PART_2N×nU partition mode, PART_2N×nD partition mode, PART_nL×2N partition mode and PART_nR×2N partition mode.

4. The method of claim 1, wherein the group of candidate prediction modes consists of 2N×2N partition mode, 2N×N partition mode, N×2N partition mode and N×N partition mode.

5. The method of claim 1, wherein the group of candidate prediction modes consists of 2N×nU partition mode, 2N×nD partition mode, nL×2N partition mode and nR×2N partition mode.

6. The method of claim 1, wherein the group of candidate prediction modes consists of 2N×2N partition mode, 2N×N partition mode, N×2N partition mode, N×N partition mode, 2N×nU partition mode, 2N×nD partition mode, nL×2N partition mode and nR×2N partition mode.

7. The method of claim 1, wherein the DBBP flag is parsed from a CU (coding unit) level of the bitstream.

8. The method of claim 7, wherein the DBBP flag is parsed from a CU extension syntax table in the CU level of the bitstream.

9. The method of claim 1, wherein the prediction partition mode is determined from a syntax element in a CU (coding unit) level of the bitstream.

10. The method of claim 1, when the DBBP is used in the current texture coding unit, the partition flag is used to represent the partition for motion information storage in DBBP and is not used to represent the partition of motion compensation.

11. A method of signaling depth-based block partitioning (DBBP) for multi-view or three-dimensional (3D) video encoding, the method comprising:
- receiving input data associated with a current texture coding unit in a texture picture;
- determining a prediction partition mode from a group of candidate prediction modes including a non-2N×N partition mode for the current texture coding unit to partition the current texture coding unit into one or more prediction units according to the prediction partition mode;
- signaling a DBBP flag for the current texture coding unit having any candidate prediction mode including said non-2N×N partition mode to indicate whether DBBP processing is applied to the current texture coding unit; and
- if the DBBP flag indicates the DBBP being used for the current texture coding unit, applying DBBP coding to the current texture coding unit.

12. The method of claim 11, further comprising signaling the prediction partition mode in a CU (coding unit) level of a bitstream including coded data of the current texture coding unit.

13. The method of claim 12, wherein a first syntax element corresponding to the DBBP flag of the current texture coding unit is located before a second syntax element corresponding to the prediction partition mode of the current texture coding unit in the CU level of the bitstream.

14. The method of claim 12, wherein a first syntax element corresponding to the DBBP flag of the current texture coding unit is located after a second syntax element corresponding to the prediction partition mode of the current texture coding unit in the CU level of the bitstream.

15. The method of claim 11, wherein the DBBP flag is signaled in a CU (coding unit) level of a bitstream including coded data of the current texture coding unit.

16. The method of claim 15, wherein the DBBP flag is signaled in a CU extension syntax table in the CU level of the bitstream.

17. The method of claim 11, when the DBBP is used for the current texture coding unit, the prediction partition mode is used to represent the partition for motion information storage in DBBP and is not used to represent the partition of motion compensation.

18. The method of claim 11, wherein the group of candidate prediction modes consists of 2N×N partition mode and N×2N partition mode.

19. A method of signaling depth-based block partitioning (DBBP) for multi-view or three-dimensional (3D) video decoding, the method comprising:
- receiving a bitstream including coded data of a current texture coding unit in a texture picture;
- determining whether the current texture coding unit is coded using an Intra partition mode;
- parsing a DBBP flag from the bitstream if the current texture coding unit is not coded using the Intra partition mode;
- if the DBBP flag indicates the DBBP being used for the current texture coding unit, deriving one or more prediction units associated with the current texture coding unit from the bitstream and applying DBBP decoding to the coded current texture coding unit to recover the current texture coding unit; and
- if the DBBP flag indicates the DBBP being not used for the current texture coding unit:
- parsing a prediction partition mode from a CU (coding unit) level of the bitstream; and applying decoding process to coded data associated with one or more prediction units partitioned from the current texture coding unit according to the prediction partition mode.

* * * * *